United States Patent [19]

Yoda

[11] Patent Number: 5,185,821
[45] Date of Patent: Feb. 9, 1993

[54] IMAGE FILING APPARATUS FOR SERIALLY STORING INPUT INFORMATION

[75] Inventor: Nobuhisa Yoda, Tokyo, Japan

[73] Assignee: Kabushiki Kaisha Toshiba, Kawasaki, Japan

[21] Appl. No.: 753,083

[22] Filed: Aug. 30, 1991

[30] Foreign Application Priority Data

Aug. 31, 1990 [JP] Japan .................................. 2-228005

[51] Int. Cl.$^5$ ............................................. G06K 9/20
[52] U.S. Cl. ..................................... 382/61; 382/57; 358/403
[58] Field of Search ..................... 382/61, 57; 209/548; 271/258, 265; 358/401, 403

[56] References Cited

U.S. PATENT DOCUMENTS

| | | | |
|---|---|---|---|
| 4,574,395 | 3/1986 | Kato ...................................... | 382/61 |
| 4,760,606 | 7/1988 | Lesnick et al. ........................ | 382/61 |
| 5,003,627 | 3/1991 | Wataya et al. ......................... | 382/61 |

Primary Examiner—Michael T. Razavi
Assistant Examiner—Steven P. Klocinski
Attorney, Agent, or Firm—Cushman, Darby & Cushman

[57] ABSTRACT

An image data processing apparatus for managing a plurality of document images comprising a scanner for reading in document images as electric image data, a volatile memory for temporarily registering the image data, a non-volatile memory device, such as an optical disk, for storing the image data, a character recognition device for recognizing a character put in a predetermined area of the image data scanned by the scanner, and then creating coded data corresponding to the character. It is determined whether or not the actual current page number of a current document, which is recognized by the character recognition device, is sequential with the previous page number of a document image read in immediately before the current document image. The storage of each document image in the non-volatile memory device is controlled by a determination result.

12 Claims, 7 Drawing Sheets

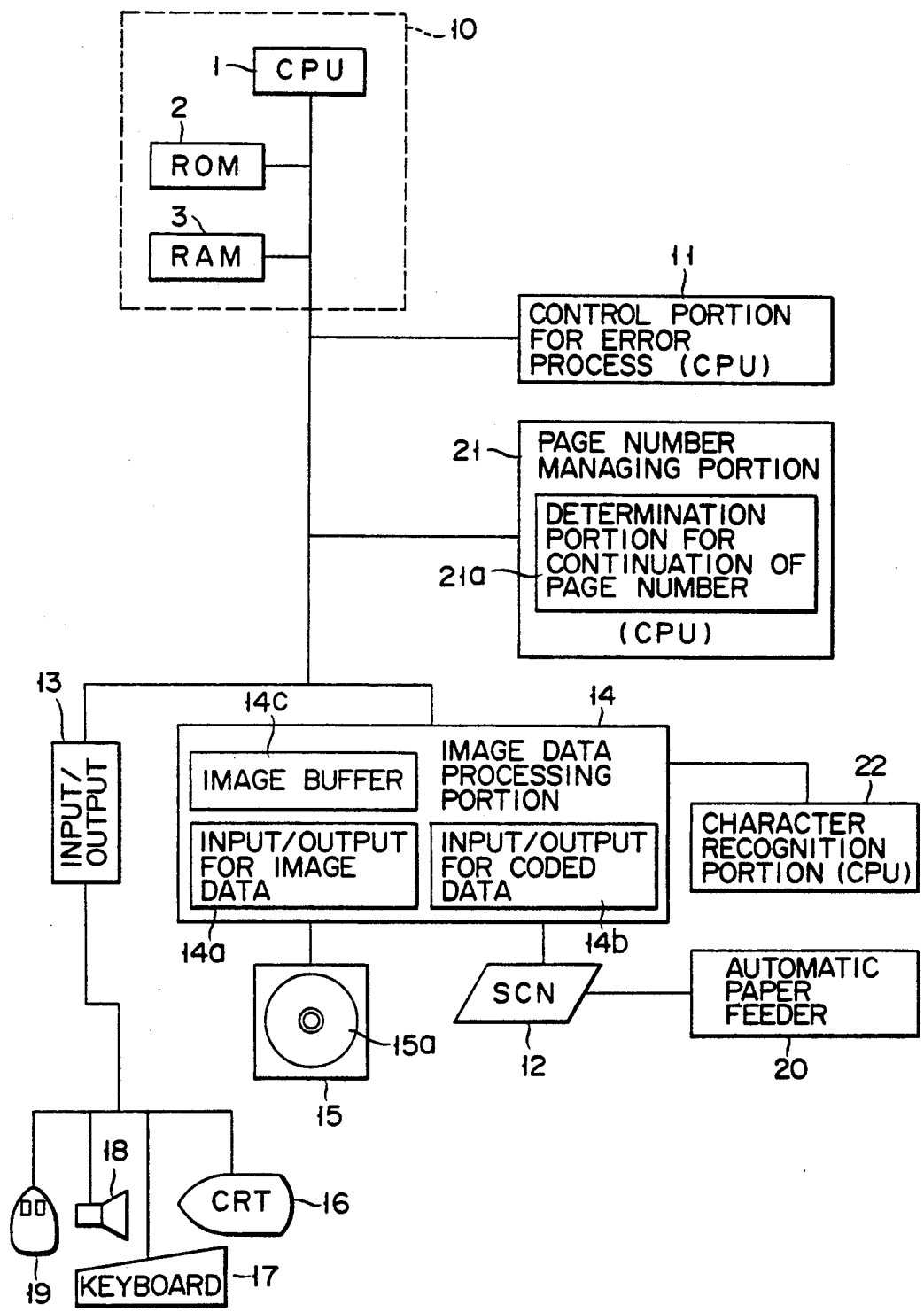
F I G. 1

| INCREASE OF PAGE NUMBER | PREVIOUS PAGE NUMBER | ESTIMATED CURRENT PAGE NUMBER | ACTUAL CURRENT PAGE NUMBER |
|---|---|---|---|
| 1 | 3 | 4 | 4 |

FIG. 2

| IDENTITY OF PAGE NUMBER AREA LOCATIONS | COORDINATES OF PAGE NUMBER AREA | | | |
|---|---|---|---|---|
| | $X_i$ | $Y_i$ | $X_e$ | $Y_e$ |
| TRUTH | 1300 | 1600 | 1600 | 1630 |

FIG. 3

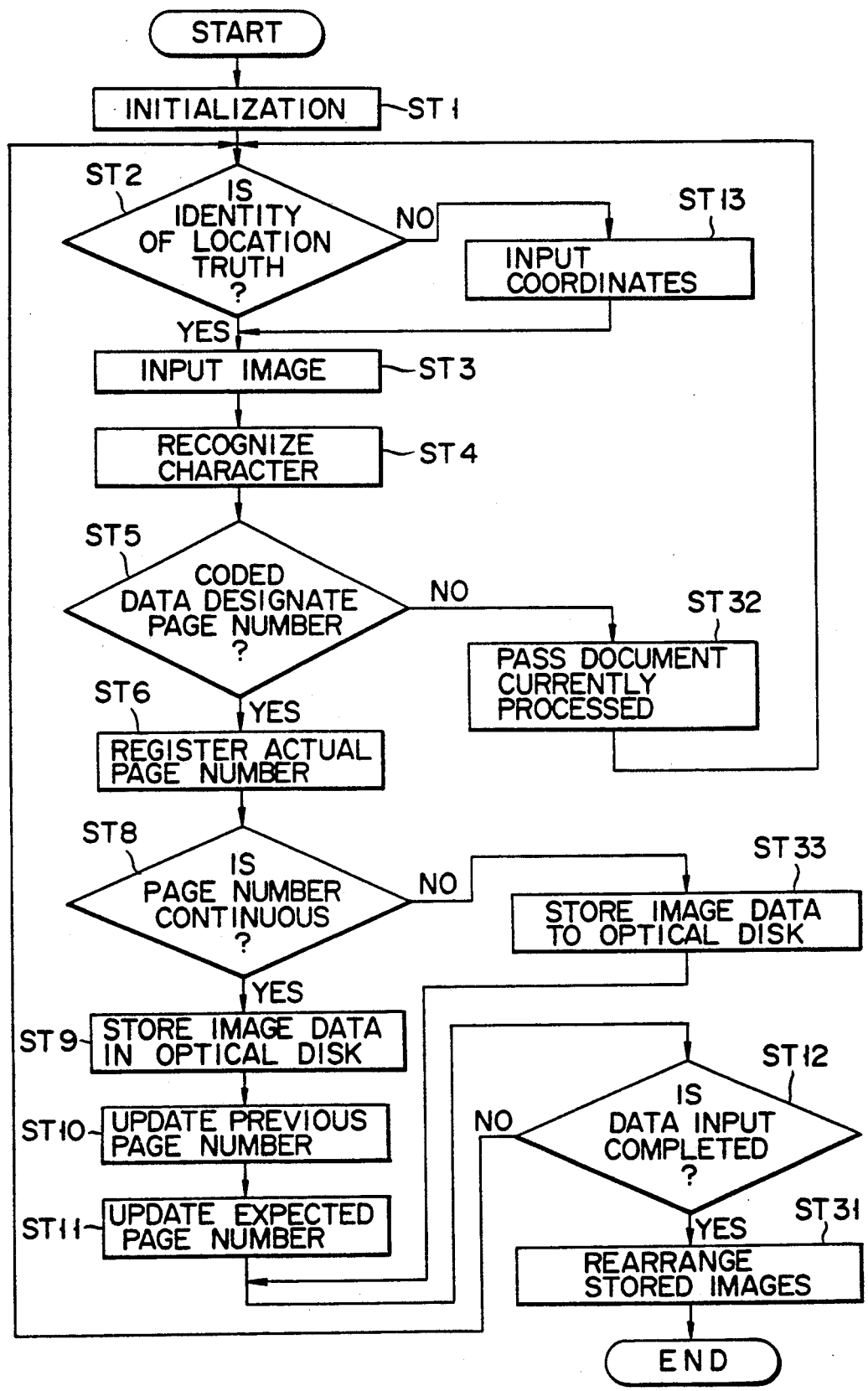
F I G. 8

IMAGE FILING APPARATUS FOR SERIALLY STORING INPUT INFORMATION

BACKGROUND OF THE INVENTION

1. Field of the Invention

This invention relates to an image data processing apparatus using a memory medium of high capacity, such as an optical disk, for storing a large amount of image data.

2. Description of the Related Art

In recent years, various data-managing apparatuses have been developed, which process much document data including image data and coded data stored in a high-capacity memory such as an optical disk. These apparatuses can store data, and search, display, and edit the data.

To store an image on a document in e.g. an optical disk, the apparatus scans it by using a scanner employed therein, and then temporarily registers image data corresponding to the document image in a buffer memory, after subjecting the image to photoelectric conversion. The stored image data is displayed on a CRT display. If the operator visually determines that the image data is correctly read in, he inputs a keyword for the data, to be used for searching it, from the keyboard, thereby storing the data in the optical disk.

Further, to enhance the efficiency of the processing required for storing document images, an apparatus has been proposed in which lots of document images can be continuously input by using a scanner with an automatic paper-feeding mechanism. In this apparatus, for example, keywords to be used for searching the document images may be predetermined so that they will be automatically assigned to the images, so as to store the images at a time. Alternatively, particular data contained in each of the document images may be recognized as keywords for searching, which consist of character string coded data, thereby automatically storing the images together with the recognized keywords.

To employ these methods, however, each document image must be inserted into the scanner in a correct manner, and must be read in by the scanner. To this end, the operator must confirm whether or not the document images are correctly read in, i.e., whether or not they are fed in correctly. Hence, to store many document images, the operator must carefully preserve the image quality, so as not to set every document image upside down or inside out, and not to have any missing page. This not only troubles the operator, but also costs a great deal and requires much time.

SUMMARY OF THE INVENTION

The object of the present invention is to provide an image data processing apparatus which can store document images at high efficiency without burdening the operator.

To attain the object, the apparatus of the invention comprises:

read-in means for reading in document images as image data;

register means for temporarily registering the image data;

non-volatile memory means for storing the image data;

character recognition means for recognizing a character put in a predetermined area of the image data registered in the register means by the read-in means, and then creating coded data corresponding to the character and indicative of the actual current page number of a current document image now being processed;

determination means for determining whether or not the actual current page number is sequential with the last page number of a document image read in immediately before the current document image; and control means for controlling the storage of the image data in the non-volatile memory means, in accordance with a determination result obtained from the determination means.

The apparatus constructed above can automatically detect an input error or a missing page.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram showing an image data processing apparatus of the invention;

FIG. 2 is a page number-managing table;

FIG. 3 is a page number area-managing table;

FIG. 8 is a flowchart showing the operation of a fourth embodiment of the invention.

DETAILED DESCRIPTION OF THE PREFERRED EMBODIMENTS

Figure 4:
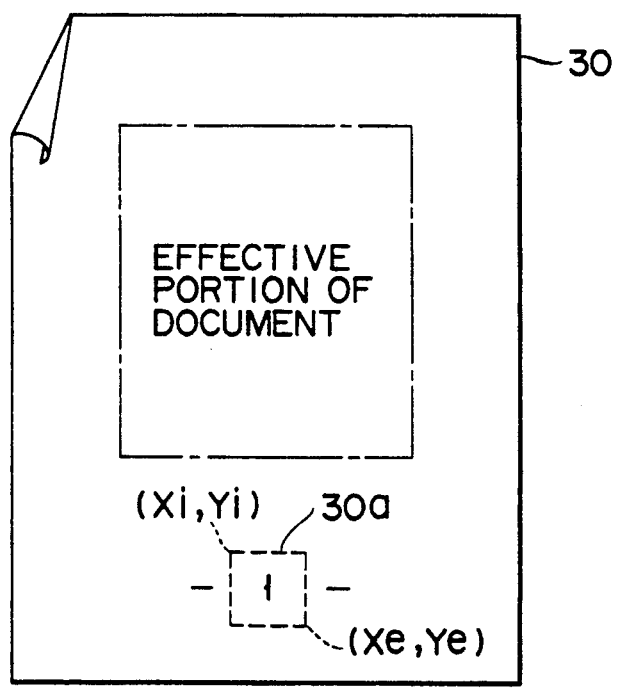
FIG. 4 is a view showing a page number region in a document.

This invention will be explained with reference to the accompanying drawings showing embodiments thereof.

FIG. 1 shows an image data processing apparatus of the invention. A total processing control section 10 comprises a CPU (Central Processing Unit) 1 for controlling the entire apparatus, a ROM (Read Only Memory) 2 and a RAM (Random Access Memory) 3, which store programs used for processing the image data and/or the image data. An error-processing control section 11 is connected to the control section 10, for controlling error-process to be executed upon occurrence of an error. For example, if a scanner 12 malfunctions during reading a document image, the error-processing control section 11 controls an image data processing section 14 to stop the operation of the scanner 12, and also controls an input/output unit 13 to cause a CRT display 16 to display an alarm message.

The scanner 12 has an automatic paper-feeding mechanism 20, and converts an optical signal, obtained by optically scanning a document, to an electric signal.

The image data processing section 14 is connected to the total processing control section 10, for temporarily registering document image data created by the scanner 12 in a volatile memory or image buffer 14c incorporated therein, then processing the registered data. The processing section 14 further includes an image data input/output unit 14a for inputting the image data created by the scanner 12, a coded data input/output unit 14b for inputting coded data (e.g. a page number) created by a character recognition section 22, hereinafter referred to. The section 14 is connected to an optical disk drive or non-volatile memory device 15. Image data and image data-searching keywords are stored in and read out from an optical disk 15a through the section 14.

The character recognition section 22 is connected to the image data processing section 14, for recognizing a character (e.g. a page number) located at a predetermined area of a document image read in by the scanner 12, then creating coded data corresponding to the character.

A page number-managing section 21 is connected to the total processing control section 10, and manages as a page number, the coded data created in the character recognition section 22. The section 21 has a continuity determination unit 21a for determining whether or not the page numbers of document images which are being successively input are in order. If it determines that the page numbers are out of order, it informs the total processing section 10 of this.

Operation of the error-processing control section 11, page number-managing section 21, and character recognition section 22 may also be accomplished by executing programs corresponding to the operation, stored in the ROM 2 and/or RAM 3 by means of the CPU 1.

The input/output unit 13 is connected to the total processing control section 10, and interfaces with the CRT display 16, a keyboard 17, a mouse 19, and a bell 18.

The CRT display 16 is controlled by the total processing control section 10, to display an alarm message upon occurrence of an error during image data input process, as well as to display image data.

The keyboard 17 is input with instructions for various operations and with set values by operator, and informs the total processing control section 10 of those input data via the input/output unit 13.

The bell 18 controlled by the control section 10 via the input/output unit 13, sounds an alarm upon occurrence of an error.

FIG. 2 shows contents of a page number-managing table 40 consisting of four registers 41–44 managed in the page number-managing section 21. The registers 41–44 indicate "Increase of Page Number", "Previous Page Number", "Estimated Current Page Number", and "Actual Current Page Number", respectively.

The register 41 indicates a predetermined increase to be added to the page number each time a new document image is input. Thus, if the page number is increased by 1 each time a new document image is input, the number stored in the register is "1".

The register 42 indicates the page number of a document image registered in the image buffer 14c of the processing section 14 immediately before the current document image, i.e., indicates the last page number. At the start of the processing, "null (0)" is stored as the initial value.

The register 43 indicates the estimated current page number of the document image stored in the buffer 14c. That is, this estimated current page number is obtained by adding a predetermined increase value stored in the register 41 to the page number stored in the register 42.

The register 44 indicates the actual current page number of document image stored in the buffer 14c.

Then, the estimated current page number is compared with the actual current page number by means of the continuity determination unit 21a. If the former is not identical to the latter, it is determined that there is at least one page having no characters in its predetermined area, or that there is a document fed in a wrong way (i.e., fed upside down or inside out). Thus, it is determined that an input error has occurred when the estimated value is not equal to the actual value.

FIG. 3 is a page number area-managing table 50 consisting of two registers 51 and 52, managed in the character recognition section 22. The registers 51 and 52 indicate "Identity of Page Number Area" and "Coordinates of Page Number Area", respectively.

The register 51 indicates whether or not the coordinates of the page number are identical for each page number area of all the document images successively input. That is, if the register 51 indicates "Truth" represented by e.g. "1", it is determined that the page number areas have the same set of coordinates. In this case, the page number is read from the same page number area. On the other hand, if "Falsity" e.g. "0" is indicated the page number areas of the document images to be stored are renewed by the operator one by one.

As is shown in FIG. 4, the register 52 indicates the coordinates (Xi, Yi) of the left uppermost portion of a page number area 30a, and the coordinates (Xe, Ye) of the right undermost portion of the same.

An operation of the image data processing apparatus of the invention, according to a first embodiment, will be explained in detail with reference to FIG. 5.

Figure 5:
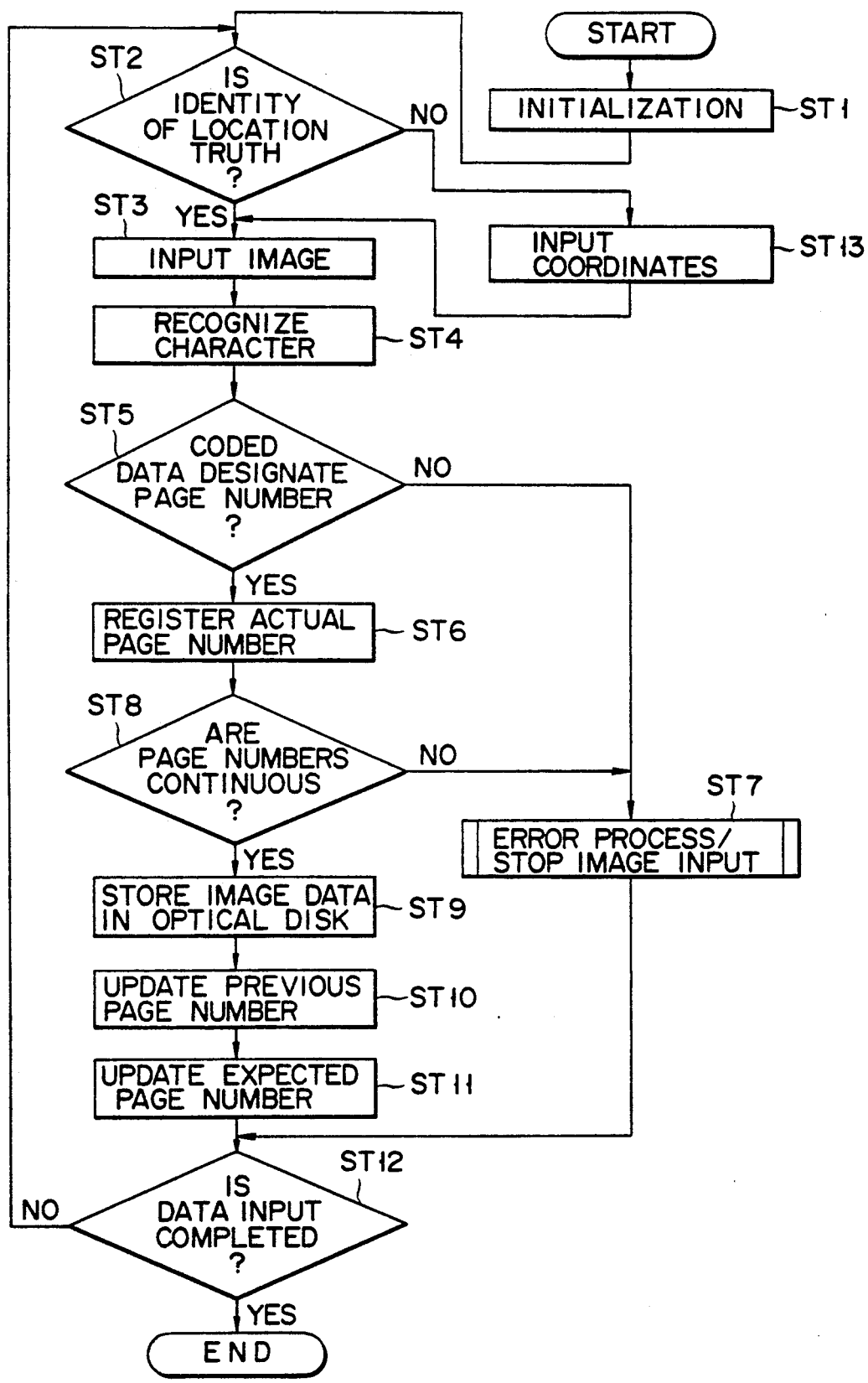
FIG. 5 is a flowchart showing the operation of a first embodiment of the invention.

FIG. 5 is a flowchart for storing a document image, or a plurality of items of information input.

For example, when document images of a plurality of pages are written into the optical disk 15a, a document of a plurality of pages are set in the automatic paper feeder 20, and then the system is initialized. That is, the memory is assigned to the page number-managing table 40 (FIG. 2) and to the page number area-managing table 50 (FIG. 3), and initial values are input into the registers of the tables. The operator inputs these initial values through the keyboard 17 into the tables 40 and 50, which are displayed on the CRT display 16 (step ST1).

When the instruction to start to input image data is supplied from the keyboard after the initialization, the contents of the register 51 indicating "Identity of Page Number Area", which is included in the page number area-managing table 50, are checked (step ST2).

Here, assume that the register 51 indicates "Truth", i.e., that the same page number area is set in each page of the documents. Then, the total processing control section 10 reads it in, thereby controlling the scanner 12 to scan the first page of the document (step ST3).

The document image scanned by the scanner 12 is temporarily stored in the image buffer 14c via the image data input/output unit 14a. A part of the read-in image data which regards the area 30a and corresponds to the "Coordinates of Page Number Area" of the managing table 50 is transferred to the character recognition section 22, where a character in the area is recognized, and coded data corresponding to the character is created (step ST4). This coded data is transferred to the coded data input/output unit 14b, where it is determined whether or not the coded data indicates a page number (step ST5).

If it is determined that the coded data is not a page number, the error-processing section 11 executes error-process, and the CRT display 16 displays an alarm message (step ST7).

On the other hand, if it is determined that the coded data is a page number, the coded data is transferred to the page number-managing table 40 in the page number-managing section 21 via the total processing control section 10, where it is stored, as number data, in the register indicating the "Actual Current Page Number" (steps ST5 and ST6).

Then, the continuity determination unit 21a determines whether or not the read-in actual page number is equal to an estimated number, i.e., the "Estimated Current Page Number" and the "Actual Current Page Number" stored in the page number-managing table 40 are compared with each other (step ST8). If these values are equal to each other, the input image data is determined to be valid, and therefore stored in the optical disk 15 (step ST9).

Then, preprocessing is performed for starting to read in the next document image. Namely, the value of the register 42 indicating the "Previous Page Number" is changed from the present value to the value stored in the register 44 indicating the "Actual Current Page Number" (step ST10). Further, the value of the register 43 indicating the "Estimated Current Page Number" is changed to a value obtained by adding the value stored in the register 41 indicating an "Increase of Page Number" to the new value of the register 42 (step ST11). Thus, the last page number of the document image stored into the optical disk is stored in the register 42 indicating the "Previous Page Number", while the page number to be input next is stored in the register 43 indicating the "Estimated Current Page Number".

After the above preprocessing, the processings performed in these steps are repeated until termination of the processings is instructed from the keyboard, or until all the document images have been stored in the optical disk 15a (step ST12). In this way, the image data read from the document of a plurality of pages are stored in the disk 15a successively and in order.

If, however, the register 51 indicating the "Identity of Page Number Area" indicates "Falsity" in the step ST2, the CRT display 16 displays the page number area-managing table 50 (FIG. 3). In this case, the operator inputs via the keyboard the coordinates of an area in which the page number of each document image exists (step ST13). (Here, it should be noted that the input of the coordinates is facilitated by displaying a document image on the CRT display 16, and scanning it by using a mouse 19.) Thus, characters contained in predetermined areas in respective document images are recognized, thereby checking the continuity of the page numbers of the document images. The storage of document images in the optical disk 15a is controlled by the checking result.

Figure 6:
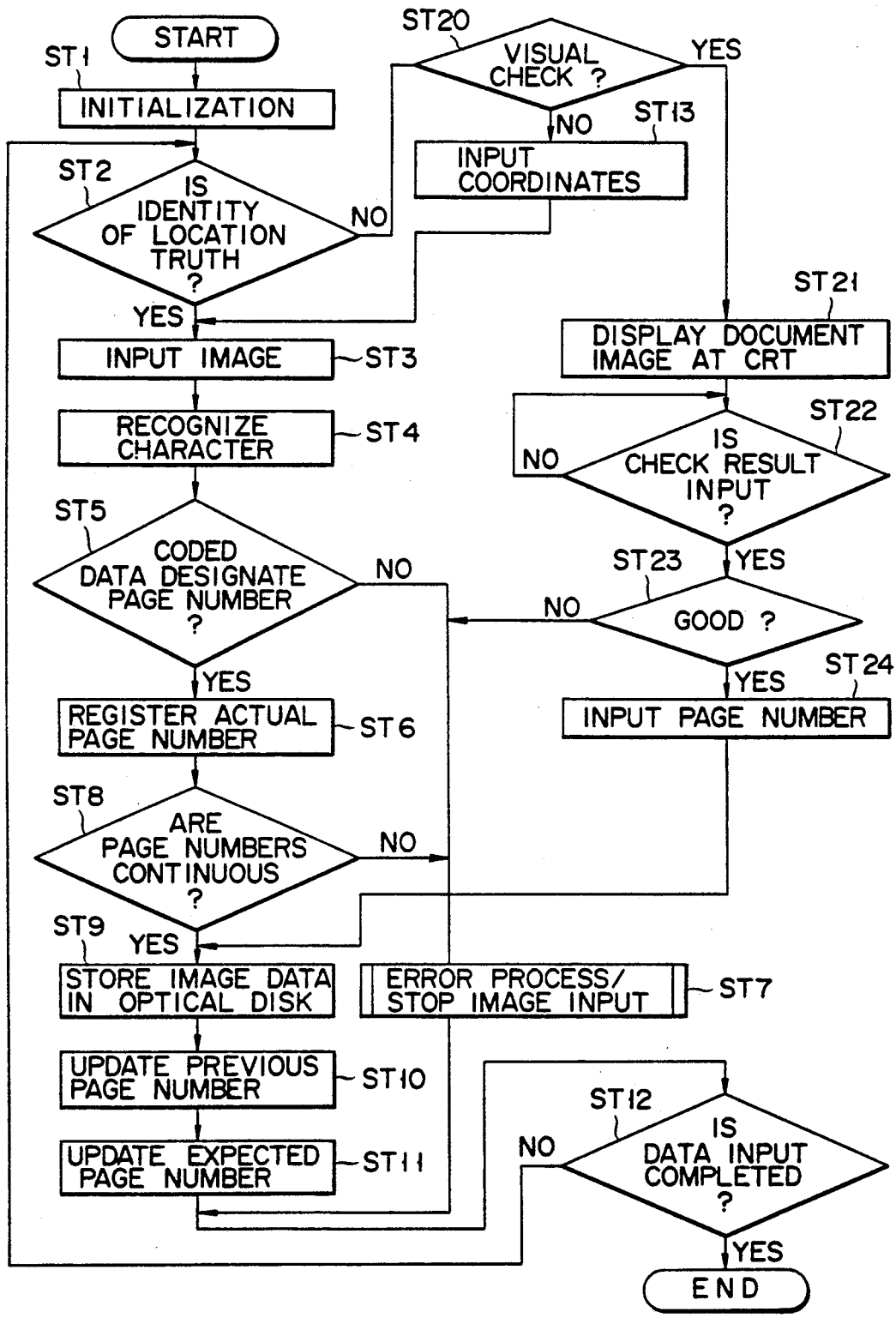
FIG. 6 is a flowchart showing the operation of a second embodiment of the invention.

FIG. 6 shows an alternative processing to be effected in a case where the operator checks the page number area with his or her eyes if the register 51 indicates "Falsity". In a step ST20, the operator selects to check with his eyes, and then in a step ST21, the total processing control section 10 displays document images on the CRT display 16. He checks the document with his or her eyes, and inputs the checking result by means of the keyboard 17 (step ST22). If the displayed document image is "Good", its page number is input (steps ST23 and 24), whereas if it is "NG", i.e, if it is not good, error-process is effected (step 7).

Figure 7:
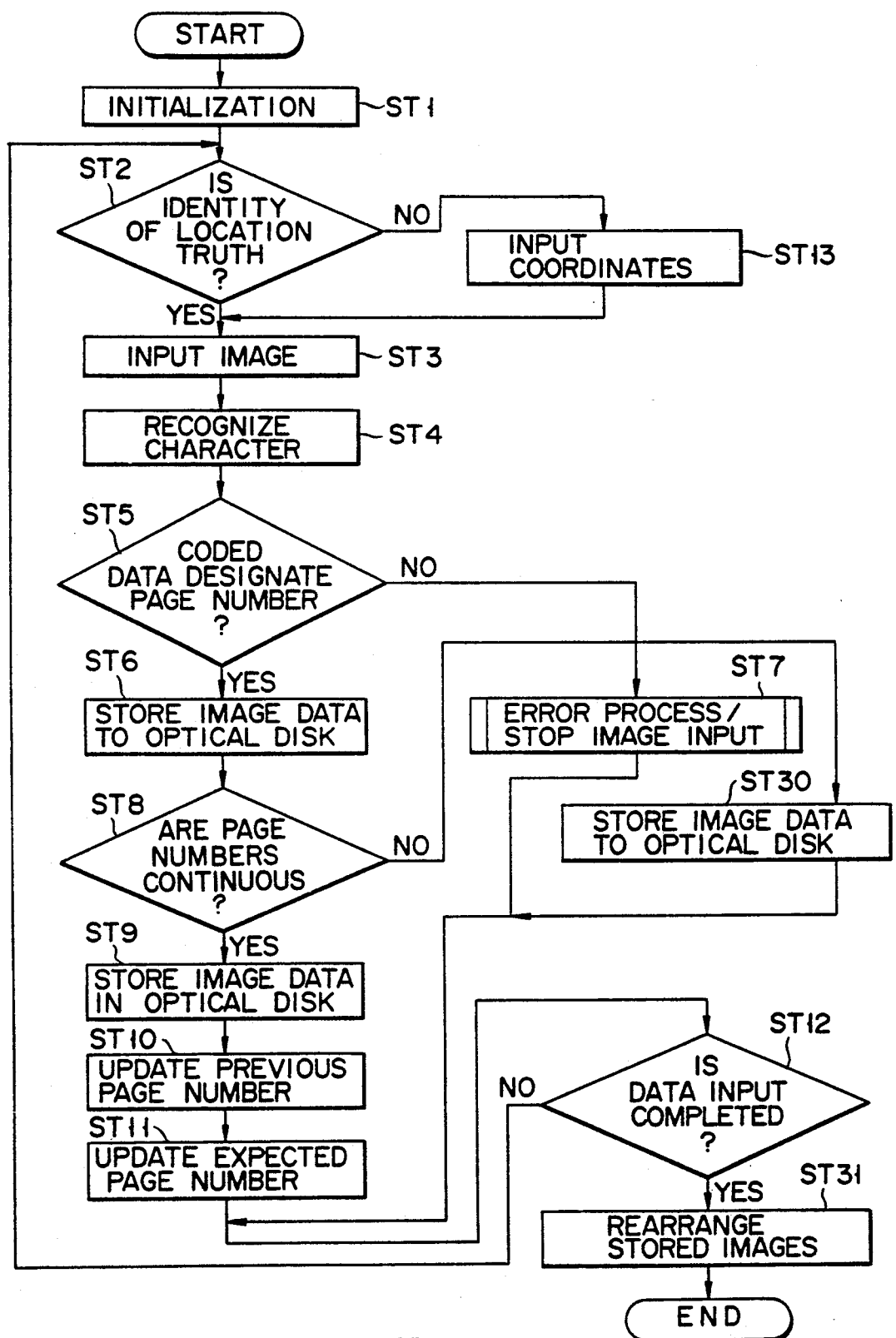
FIG. 7 is a flowchart showing the operation of a third embodiment of the invention.

Then, the processing to be effected in the step ST7 when it is determined that the page numbers are out of order will be explained. If it is determined in the step ST8 that the read-in actual value is not equal to the estimated value, the continuity determination unit 21a informs the total processing control section 10 of the incontinuity of the page numbers. The section 10 judges if there is a wrong page number in the document pages or a missing page, and instructs the scanner 12 via the image data processing section 14 to stop scanning, while instructing the CRT display 16 and bell 18 to display an alarm message and to sound an alarm, respectively. Thus, when it is determined that the page numbers are out of order, the error-process is effected, also the image data read at this time is not stored in the optical disk 15, and further the operator is informed of the determination result.

Where it is determined in the step ST8 that the actual value is not equal to the estimated value, there can be other methods for removing errors. For example, as shown in FIG. 7, the image data and page number is stored in the optical disk in a step ST30, and thereafter the page numbers of the images stored are rearranged in order in a step ST31.

Further, as shown in FIG. 8, in a case where it is determined in the step ST5 that the read-in character is not a number, the current page may be passed over (step ST32), thereby reading in the next page. This method is also effective. In this method, all the document images which do not lack page numbers are stored in the optical disk 15a, and thereafter the operator is informed of the input error, if found, that there is a missing page or a page having a wrong page number. This being so, document images to be input need not necessarily be arranged in order.

In addition, index numbers can be used in place of page numbers to check the continuity of document images.

It is a matter of course that the present invention can be modified without departing from the subject manner of the invention.

In summary, the present invention can automatically detect missing pages or image data input errors without troubling the operator. In the invention, while document images are successively input and stored in an optical disk, their page numbers are recognized, and the continuity of the numbers is checked. The determination that the page numbers are out of order means that there is a missing page or that a document image is fed in an inside-out manner or in an upside-down manner. Thus, the visual confirmation by the operator can be reduced to a minimum possible extent, which facilitates the automation of data storage.

Additional advantages and modifications will readily occur to those skilled in the art. Therefore, the invention in its broader aspects is not limited to the specific details, and representative devices, and illustrated examples shown and described herein. Accordingly, various modification. may be made without departing from the spirit or scope of the general inventive concept as defined by the appended claims and their equivalents.

What is claimed is:

1. An image filing apparatus for serially storing information items comprising:
   input means for serially inputting information items, each of the information items having page data representing one page of data;
   recognition means for recognizing page number values written on the page data of each of the inputted information items;
   determination means for determining whether or not the page number values recognized by the recognition means are continuous; and
   storage means for storing the inputted information items into a memory medium if it is determined by the determination means that the page number values are continuous.

2. The apparatus according to claim 1, wherein the determination means includes a page number managing register comprising:
   a page number increase register registering a predetermined increase value in the page number values recognized by the recognition means for each o the information items serially input by the input means;
   a previous page number register registering the page number value of one information item into the memory medium immediately before the next information item is input by the input means;
   an estimated current page number register for registering an estimated current page number value calculated for a currently inputted information item; and
   an actual current page number register registering the page number value recognized by the recognition means for the currently inputted information item;
   wherein the estimated current page number value of the page data of the information is obtained by adding the predetermined increase value registered in the page number increase register to the page number value registered in the previous page number register, and the sum is compared with the page number value registered in the actual current page number register, thereby determining the continuity of the page number values of the page data of the information items serially input by the input means;
   wherein the storage means replaces the page number value registered in the previous page number register with the page number value registered in the actual current page number register, thereby registering a new previous page number value in the previous page number register, and replaces the page number value registered int he estimated current page number register with a value obtained by adding the predetermined increase value registered in the page number increase register to the new previous page number value registered in the previous page number register, thereby registering a new estimated page number value in the estimated current page number register after it is determined that the actual current page number value is sequential with the page number value for the previous page data of information.

3. The apparatus according to claim 1, further comprising means for displaying an error message whenever coded data created by the recognition means is not a numeral code and also whenever it is determined by the determination means that the actual current page number value is not sequential with the previous page number value.

4. An image data processing apparatus for managing a plurality of document images each representing one page of data, having a scanner for sequentially inputting document images, a register for registering the document images, a non-volatile memory device for storing the registered document images, and a display for displaying the document images, comprising:
   coded data-creating means for recognizing a character written in a predetermined page number area of the document images, and then creating coded data corresponding to the character and indicative of a page number value of a document image being processed;
   determination means for determining continuity between the page number value of the document image being processed and a previous page number value indicative of the page number value of a document image inputted immediately before the document image being processed; and
   control means for controlling storage of the document images in the non-volatile memory device, in accordance with a determination result obtained from the determination means.

5. The apparatus according to claim 4, wherein the determination means includes:
   continuity determination means for determining continuity by comparing the coded data, obtained from the coded data-creating means, with an estimated current page number, obtained by adding a predetermined increase, indicative of a difference between page number values of any two sequentially inputted document images, to the previous page number value;
   means for replacing the previous page number value with the page number value of the document image being processed, thereby registering a new previous page number value, if it is determined that the page number value of the document image being processed is sequential with the previous page number value; and
   means for replacing the estimated current page number with a new estimated current page number value, obtained by adding the predetermined increase to the previous page number value, thereby registering a new estimated current page number.

6. The apparatus according to claim 4, further comprising:
   means for detecting whether or not the predetermined page number area of the document images sequentially inputted have the same coordinates; and
   means for inputting coordinates for a page number area for each of the document images, if it is detected by the detection means that the predetermined page number areas of the document images do not have the same coordinates;
   wherein the coded data-creating means determines the page number area according to the coordinates obtained in the means for inputting coordinates.

7. The apparatus according to claim 4, further comprising:
   means for detecting whether or not the predetermined page number area of the document images sequentially inputted have the same coordinates;
   display means for displaying the document images, if it is detected by the detection means that the predetermined page number area of the document images do not have the same coordinates;

means for inputting a determination whether or not the document image being inputted is correct;

means for inputting the page number value of the document image being inputted if it is determined that the document image being inputted is correct; and means for storing the document image which is determined to be correct in the non-volatile memory device.

8. The apparatus according to claim 4, further comprising:

means for storing the document images and their respective page numbers in the non-volatile memory device, even if it is determined that there is no continuity between the page number value of the document image being processed and the previous page number value; and means for arranging in order the document images stored out of order, after all the document images are stored.

9. The apparatus according to claim 4, wherein the coded data-creating means includes means for determining whether or not the coded data is a numeral code, and means for not storing the document image being processed, if the coded data is not a numeral code and displaying a message describing that the document image has not been stored.

10. An image filing apparatus for serially storing information items, comprising:

input means for serially inputting information items, each of the information items having page data representing one page of data;

recognition means for recognizing page number values written on the page data of each of the inputted information items;

determination means for determining whether or not the page number values recognized by the recognition means are continuous;

storage means for storing the inputted information items into a memory medium if it is determined by the determination means that the page number values are continuous; and display means for displaying a determination result obtained from the determination means before the storage means stores information, if it is determined that the page number values are not continuous.

11. The apparatus according to claim 10, wherein the determination means includes a page number managing register comprising:

a page number increase register registering a predetermined increase value in the page number values recognized by the recognition means for each of the information items serially input by the input means;

a previous page number register registering the page number value of one information item into the memory medium immediately before the next information item is input by the input means;

an estimated current page number register registering an estimated current page number value calculated for a currently inputted information item; and an actual current page number register registering the page number value recognized by the recognition means for the currently inputted information item;

wherein the estimated current page number value of the page data of the information is obtained by adding the predetermined increase value registered in the page number increase register to the page number value registered in the previous page number register, and the sum is compared with the page number value registered in the actual current page number register, thereby determining the continuity of the page number values of the page data of the information items serially input by the input means;

wherein the storage means replaces the page number value registered int he previous page number register with the page number value registered in the actual current page number register, thereby registering a new previous page number value in the previous page number register, and replaces the page number value registered in the estimated current page number register with a value obtained by adding the predetermined increase value registered in the page number increase register to the new previous page number, value registered in the previous page number register, thereby registering a new estimated page number value in the estimated current page number register after it is determined that the actual current page number value is sequential with the page number value for the previous page data of information.

12. The apparatus according to claim 10, wherein the display means further comprises means for displaying an error message whenever coded data created by the recognition means is not a numeral code and also whenever it is determined by the determination means that the actual current page number is not sequential with the previous page number.

* * * * *